Feb. 3, 1970 JULIUS J. HAUCK 3,492,907
PLASTIC TACK STRIP
Filed Jan. 25, 1968 2 Sheets-Sheet 1
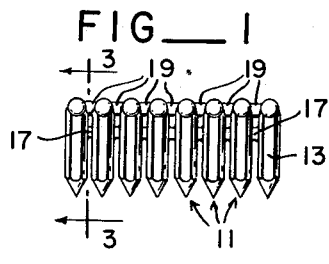
FIG__1
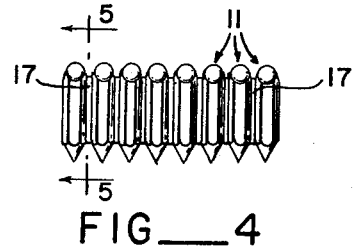
FIG__4
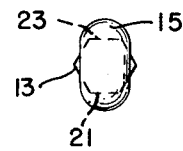
FIG__2
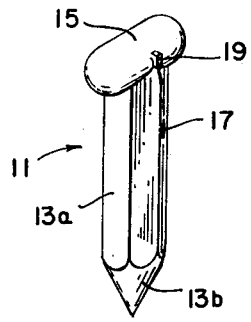
FIG__3
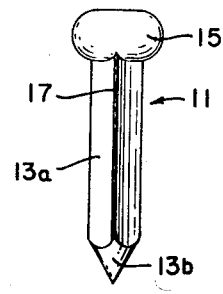
FIG__5
J. J. HAUCK
INVENTOR.
BY
ATTORNEYS Feb. 3, 1970  JULIUS J. HAUCK  3,492,907
PLASTIC TACK STRIP
Filed Jan. 25, 1968  2 Sheets-Sheet 2
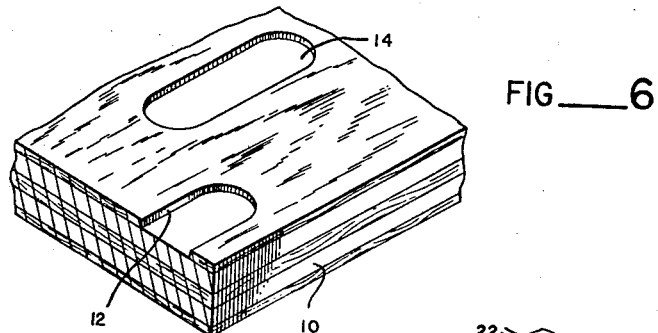
FIG__6
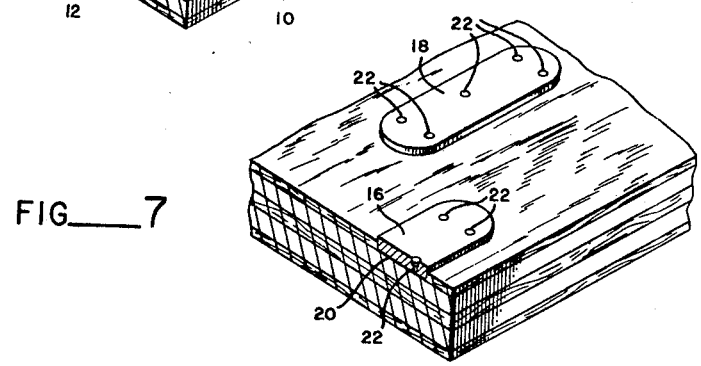
FIG__7
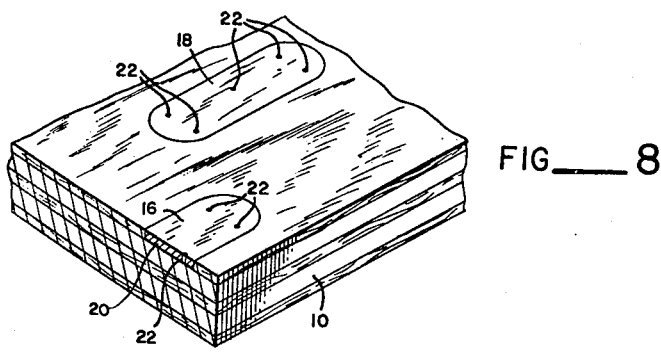
FIG__8
J. J. HAUCK
INVENTOR.
BY Seed, Berry & Dowrey
ATTORNEYS United States Patent Office 3,492,907
Patented Feb. 3, 1970

3,492,907
PLASTIC TACK STRIP
Julius J. Hauck, Salem, Oreg., assignor to Simpson Timber Company, Seattle, Wash., a corporation of Washington
Filed Jan. 25, 1968, Ser. No. 700,592
Int. Cl. F16b 15/08
U.S. Cl. 85—17                                                    4 Claims

ABSTRACT OF THE DISCLOSURE

A molded plastic tack strip has a plurality of closely spaced tack shanks interconnected by easily severable webs.

---

This invention relates to molded plastic strips of tacks of the type wherein tacks may be individually severed from the strip and driven by a suitable device such as a pneumatic tack gun.

A primary object of this invention is to provide a molded plastic tack strip wherein the tack shanks are closely spaced so as to provide a compact strip. Another object is to provide such a strip wherein adjacent tack shanks are interconnected by an easily-severable web. A further object is to provide such a strip wherein an individual tack can be driven with its shank severed from the shank of the adjacent tack by driving contact of a tack gun reciprocating hammer against the head of the tack. Still another object of the invention is to provide a molded plastic tack strip suitable for use in cold patching plywood panels.

These and other objects and advantages will become apparent from the following description in conjunction with the accompanying drawings, of which:

FIG. 1 is a side elevation view of one tack strip embodiment molded in accordance with the invention;

FIG. 2 is a top plan view of a single tack separated from a tack strip of this invention;

FIG. 3 is a perspective view of a single tack as it would appear after being severed from the FIG. 1 tack strip along the line 3–3;

FIG. 4 is a side elevation view of another tack strip embodiment molded in accordance with the invention;

FIG. 5 is an end elevation view of a single tack as it would appear after being severed from the FIG. 4 tack strip along the line 5—5;

FIG. 6 is a perspective view of a plywood panel segment showing two routed-out sections;

FIG. 7 is a perspective view of the FIG. 6 plywood panel segment showing two patches applied and tacked into the routed-out sections with tacks from a tack strip of the invention; and FIG. 8 is a perspective view of the FIGS. 6–7 plywood panel segment with the two patches sanded flush with the panel face.

In brief, the molded plastic tack strip of this invention comprises a plurality of tacks, each having an elongated shank and an integral head, the shanks of which are closely spaced and aligned parallel to one another with adjacent shanks interconnected by thin, severable integral webs. The tack heads are non-circular to a plane defined by the row of tack shanks.

The molded plastic tack strip depicted in FIG. 1 comprises a plurality of tacks 11, each of which has an elongated shank 13 and an integral head 15. Each tack shank 13 has a body 13a with a regular hexagonal cross section and a pointed tip 13b (see FIGS. 2 and 3). Each integral tack head 15 is cylindrically-shaped with hemispherical ends (see FIG. 2). The shanks of adjacent tacks are interconnected by thin, narrow integral webs 17 positioned intermediate the ends of the shank body sections 13a. The heads of adjacent tacks are also interconnected by thin, narrow integral webs 19.

The tack shanks are formed such that two opposing faces 21–23 of each shank body section 13a are aligned parallel to a plane defined by the row of tack shanks and such that the tack shanks are in edge-to-edge adjacency, with the interconnecting webs 17 extending between the adjacent body section edges, rather than in face-to-face adjacency. The tack heads are aligned parallel to one another and oriented perpendicular to the shank body faces 21–23 (i.e. perpendicular to the plane defined by the row of tack shanks). The tack heads are transversely narrower (i.e. narrower in the direction parallel to the row of tack shanks) than the tack shanks, and the tack heads are longitudinally wider (i.e. wider in the direction perpendicular to the row of tack shanks) than the tack shanks. The tack shanks are tapered into the sides of the respective tack heads.

The FIGS. 4 and 5 embodiment is substantially the same as the FIGS. 1 and 3 embodiment except that there are no interconnecting webs between the adjacent tack heads and the interconnecting webs 17 extend substantially the full lengths of the adjacent shank body sections 13a.

The tack strips of this invention are particularly suited for use with a reciprocating blade-type hammer tack gun having a tack strip-feeding raceway perpendicular to the hammer. The raceway would comprise a pair of parallel bars or plates spaced apart slightly more than the transverse width of the tack shanks with the depth of the slot between the bars adjacent to the hammer guideway being only slightly greater than the length of the tack shanks. One or more tack strips may be inserted into the raceway with the tack heads riding on the upper edges of the bars and being urged toward the forward or hammer end of the gun by a spring loaded plunger acting on the tack strip or strips. The hammer is guided in its reciprocating action by members that define a guideway into which the loading open end of the tack strip raceway opens thereinto. The hammer guideway may be provided with an elongated groove of a width and depth to receive and confine the tack heads as each tack is shifted into the guideway and contacted by the hammer and driven thereby out through the guideway by the hammer. As the tacks are severed from the tack strip and driven, the tack shanks cannot double back into the tack strip raceway because the tack tips will be extended below the raceway shortly after tack contact by the hammer inasmuch as the raceway depth is just sufficient to accommodate the tack shanks.

As an example of a preferred application of the tack strip of this invention, refer now to FIGS. 6–8. Until the present invention, router patches for repairing surface defects in finished plywood panels of a size greater than about 1" x 3" and 1¼" x 4" had to be bonded into the routed section with a heat-setting glue under the application of heat and pressure. Each panel with a surface defect was diverted from the assembly line to a defect routing station where defects were routed out. If the routed-out section could be filled by a patch smaller than 1" x 3" or 1¼" x 4", a "cold patch" would be applied and bonded by a cold setting glue that required neither heat nor pressure to perfect the bond. Whenever a routed-out section required a larger patch the panel again had to be diverted, from the routing station, to a hot patching station where glue-bearing patches were applied and cured by the application of heat and pressure. The cold patched panels would be accumulated and then re-sanded to remove excess patch material. The hot patched panels would be separately accumulated and then resanded to remove excess patch material. "Hot patched" panels were thus relatively costly to repair because of the extra conveying and repair equipment and duplication of functions required in the second diversion.

By application of the present invention all patches can be "cold patched," the larger patches being tacked into place with plastic tacks driven from the tack strip of this invention by a suitable device such as a pneumatic tack gun. The driven tacks will hold the patch uniformly in contact with the panel while the glue cures to effect the required bond between the panel and the patch consequently, there need be only one diversion of all panels to be patched, on accumulating station for patched panels, and one line re-directing the patched panels through the sanding station to remove excess patch material.

With reference to FIG. 6, surface defects in a plywood panel 10 are routed to leave routed-out sections 12–14. These sections would usually be formed by routing tools preset to yield routed-out sections of predetermined depth and length. In routing surface defects, an operator would usually have several preset routing tools of different sizes at hand so as to be able to route defects of various pre-set sizes without unnecessarily cutting away wound surface material.

The "cold-setting" glue (i.e. a glue that cures at room temperature) applied may be a polyvinyl acetate base glue, such as manufactured by National Starch under the brand name "Duralock"; an acid curing glue, such as manufactured by Sinco, a resorcinol resin adhesive, such as manufactured by the Borden Co.; a phenolic rubber base glue, as manufactured by Pittsburgh Plate Glass; or the like. The "Duralock" glue has a relatively short curing time on the order of about three hours and the resulting glue line meets American Plywood Association standards for exterior grade plywood. Other glues may also be employed where a longer curing time is permissible or where only interior grade plywood standards need be met.

Next, wood patches 16–18, pre-cut to fit the routed-out sections 12–14, are coated with a cold setting glue on their undersides and set in place in the respective routed-out sections, the resulting glue line being indicated by the dark line 20 at the lower edge of patch 16. These patches may be glued and set by machine or by hand, the latter being the usual manner at the present time. When set by hand, the patches are firmly seated by tapping them into place with a mallet.

Following the seating of the patch in the respective routed-out section, a plurality of plastic tacks 22 are hammered through the patch into the panel. The number of plastic tacks required per patch will vary depending upon the width and length of the patch. In general, as few plastic tacks as possible are used simply for the sake of the appearance of the panel.

Any of a number of thermosetting plastics can be molded into suitable tack strips. An exemplary suitable plastic is an acetal copolymer manufactured by Celanese Corp. and marketed under the trademark "Celcon." Generally speaking, such plastics must be sufficiently resilient to enable individual tacks to be sheared from a strip and sufficiently strong to be driven into a plywood panel without shattering. If desired, normal plastic coloring procedures may be employed to color the plastic material before it is molded so that the resulting tacks will have the same general coloration of the wood panel into which the tacks are driven.

In the usual case, the patches have greater thickness than the depth of the respective routed-out sections so that the patches as applied will protrude from the panel surface as shown in FIG. 7. This is to permit the patched panel to be re-sanded so that the patch can be sanded flush with the panel face as shown in FIG. 8 without having to remove a significant amount of the panel outer ply to achieve a smooth panel face. In sanding the patch the heads of the plastic tacks will be removed, leaving the ends of the plastic tack shanks exposed flush with the panel face.

It has been observed that the plastic tacks apparently are heated when driven into the patch and panel and, upon cooling down, swell sufficiently to produce a very tight friction fit between the plastic tack shanks and the patch and panel. Consequently, the patches are maintained in good, uniform contact with the routed-out sections of the panel when tacked in place with plastic tacks.

The embodiments of the invention in which an exclusive property or privilege is claimed are defined as follows:

1. A tack strip for use in a reciprocating hammer-type tacking machine which comprises a plurality of molded plastic tacks, each tack having a shank and an integral head, with the tack shanks being closely spaced and aligned parallel to one another in a row and with the tack heads being oriented parallel to one another and perpendicular to a plane defined by the row of tack shanks, and with adjacent tack shanks being interconnected by thin, severable, integral molded plastic webs, the body section of each tack shank having a regular hexagonal cross section oriented such that the two opposing faces thereof are parallel to the plane defined by the row of tack shanks and such that adjacent tack shanks are in edge-to-edge adjacency with the web joining adjacent tack shanks extending integrally between the adjacent tack shank body section edges.

2. The stack strip of claim 1 wherein adjacent tack shanks are interconnected by narrow webs having a height less than the length of said shanks and wherein the adjacent tack heads are interconnected by thin, narrow, severable integral molded plastic webs.

3. The tack strip of claim 1 wherein each tack head is cylindrically-shaped with hemispherical ends protruding beyond the said opposing faces of the tack shank such that the tack strip may be suspended in a slot-type raceway of a tacking machine by the tack heads, and the transverse width of each tack head being less than the edge-to-edge width of the tack shank such that the tack shanks provide protruding surfaces adapted to guide the tacks as they are severed and driven by the tacking machine.

4. The tack strip of claim 1 wherein each tack is so formed that the strip can be inserted in a slot-type raceway of a tacking machine and that each tack can be guidingly driven by a blade-type hammer.

References Cited

UNITED STATES PATENTS

| | | |
|---|---|---|
| 3,348,669 | 10/1967 | Powers. |
| 3,165,968 | 1/1965 | Anstett. |
| 159,777 | 2/1875 | Sturtevant. |

FOREIGN PATENTS

| | | |
|---|---|---|
| 265,776 | 3/1950 | Switzerland. |
| 432,773 | 10/1911 | France. |

JOSEPH R. LECLAIR, Primary Examiner

JOHN M. CASKIE, Assistant Examiner